(12) United States Patent
Marron

(10) Patent No.: US 8,732,860 B2
(45) Date of Patent: May 20, 2014

(54) SYSTEM AND METHOD FOR SECURING DATA TO BE PROTECTED OF A PIECE OF EQUIPMENT

(75) Inventor: Christophe Marron, Cholet (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/551,347

(22) Filed: Jul. 17, 2012

(65) Prior Publication Data

US 2013/0024938 A1    Jan. 24, 2013

(30) Foreign Application Priority Data

Jul. 19, 2011  (FR) ...................................... 11 02256

(51) Int. Cl.
*G06F 21/00* (2013.01)
(52) U.S. Cl.
USPC ........................................................ 726/34
(58) Field of Classification Search
USPC ...................................... 726/34, 35; 713/194
See application file for complete search history.

(56) References Cited

U.S. PATENT DOCUMENTS

| 6,646,565 B1 | 11/2003 | Fu et al. | |
|---|---|---|---|
| 2005/0039040 A1* | 2/2005 | Ransom et al. | 713/200 |
| 2008/0155262 A1* | 6/2008 | Beaver et al. | 713/173 |

OTHER PUBLICATIONS

Search Report dated Jan. 5, 2012 issued for French Application No. FR 1102256.

* cited by examiner

*Primary Examiner* — Edward Zee
(74) *Attorney, Agent, or Firm* — Knobbe Martens Olson & Bear LLP

(57) ABSTRACT

A system and method for securing data to be protected of a piece of equipment are provided. The equipment comprises: a space; at least one device for processing the data; a safety module comprising at least one controller connected to at least one memory for sensitive data, the sensitive data giving access to the data; and at least one supervision sensor. The method comprises: transmitting at least one signature through the sensor(s), to the safety module, the signature being based on a signal received by the respective sensor and giving information on the physical condition of the space; comparing in the safety module at least one of the signatures and/or a value inferred from at least one of the signatures with at least one reference value and/or at least one reference signature; limiting access to the data being based on the comparison of at least one of the signatures.

9 Claims, 4 Drawing Sheets

SYSTEM AND METHOD FOR SECURING DATA TO BE PROTECTED OF A PIECE OF EQUIPMENT

CROSS-REFERENCE TO RELATED APPLICATION(S)

This application claims the benefit of French Application No. 11 02256 filed Jul. 19, 2011, which is hereby expressly incorporated by reference in its entirety.

BACKGROUND

1. Field of the Invention

The present invention relates to a system for securing data to be protected of a piece of equipment comprising:
a space;
at least one device for processing data to be protected, the processing device(s) being laid out in the space; and
a safety module comprising at least one controller connected to at least one memory for sensitive data, the sensitive data giving access to the data to be protected, the safety module being at least partly laid out in the space.

Further, the present invention relates to a method for securing data to be protected of a piece of equipment, the piece of equipment comprises:
a space;
at least one device for processing data to be protected, the processing device being laid out in the space;
a safety module comprising at least one controller connected to at least one memory for sensitive data, the sensitive data giving access to the data to be protected, the safety module being at least partly laid out in the space.

2. Description of the Related Technology

For example, the data to be protected should be protected against entrapment.

Entrapment may consist of applying probes for capturing information, for example, a data or software packages, or making internal modifications in a piece of equipment which divert its operation or the data of the piece of equipment.

There exists several solutions in present systems.

A solution is a seal placed on a casing containing for example a holographic label, which gives the possibility of checking from the outside whether the casing of the piece of equipment has been opened without any authorisation. The seal visually changes state irreversibly upon opening the casing of the piece of equipment. Illegal reproduction of a seal is normally difficult to achieve.

This solution has the drawback of only detecting the intrusion when a trustworthy operator sees the modified seal after the intrusion. Further, this does not necessarily prevent access to information in the piece of equipment. Other mechanisms are generally required for completing the protection. Seal solutions are passive and only allow by themselves the audit of an achieved attack. They do not prevent per se the entrapment.

Another solution is a system which detects drilled holes, for example as disclosed in EP 0 347 209 A2 and U.S. Pat. No. 5,539,379. These solutions are based on a cover which surrounds the whole of the relevant target. This cover integrates conductive meshing which detects any drilling and it is very difficult to get around it. Upon detecting a drilled hole, a device inside triggers an alarm, destroys or deletes an object inside the cover. Nevertheless, this system remains costly and generally does not allow protection of a piece of equipment of significant volume. Now, many pieces of equipment include several cards, compartments and have diverse shapes. Present detection cover solutions provide solutions for modules limited in volume, for example of the order of 10 cm*10 cm*10 cm. Beyond these dimensions, this technology becomes difficult to apply.

There also exists electronic components such as microcontrollers which integrate solutions for detecting an attack such as drilling. These components are limited in their performance and are not suitable for different types of equipment which use microprocessors of the last generation for obtaining real time performances of a sensitive software package.

Moreover, there presently exists systems which integrate opening detection sensors. These systems trigger an alarm upon opening one of the hatches or access doors. They are inefficient against attacks of the intrusion type, for example, by drilling or another solution for getting around normal systems for opening the piece of equipment.

By lack of a self-contained power supply in the equipment, present sensors are not very efficient and notably opening sensors. The fact of having to operate and power-off conditions rules out many sensor systems which consume too much energy.

Generally, present intrusion detection systems are not very suitable for different forms of a piece of equipment, and additionally, the systems have to operate under power-off conditions.

SUMMARY OF INVENTION

The object of the present invention is to overcome the drawbacks of the state of the art, in particular to protect against entrapment, a large internal space of a piece of equipment.

For this purpose, the invention proposes a system for securing data to be protected of a piece of equipment comprising:
a space;
at least one processing device for processing the data to be protected, the processing device(s) being laid out in the space; and
a safety module comprising at least one controller connected to at least one memory for sensitive data, the sensitive data giving access to data to be protected, the safety module being at least partly laid out in the space, characterised by
at least one supervision sensor laid out in the space, said or each sensor being connected to the controller of the safety module in order to send it a signature based on a signal received by the respective sensor, the signature giving a piece of information on the physical condition of the space, the controller being able to limit access to data to be protected on the basis of a comparison of at least one of the signatures and/or of a value inferred from at least one of the signatures with at least one reference value and/or at least one reference signature.

According to Advantageous Features:
limiting access to data to be protected comprises the destruction of sensitive data and/or non-broadcasting of sensitive data outside the safety module;
the safety module comprises at least one device for detecting an intrusion in order to detect an intrusion in the safety module, the device for detection of an intrusion being able to cause destruction and/or deletion of the sensitive data stored in the memory, upon an intrusion into the safety module;
at least one of the processing devices is laid out outside the safety module;
the sensitive data comprise data to be protected or the sensitive data are a key for decrypting and/or encrypting the data to be protected, which data to be protected are stored outside the safety module in an encrypted form;

each processing device is capable of deleting the data to be protected which are processed on the respective device on the basis of the comparison of at least one of the signatures and/or of a value inferred from at least one of the signatures with at least one reference value and/or at least one reference signature, or is able to delete upon switching off the processing devices, the data to be protected which are processed on the respective device; and/or each processing device is able to transfer the data to be protected which are processed on the respective device to the safety module on the basis of the comparison of at least one of the signatures and/or of a value inferred from at least one of the signatures with at least one reference value and/or at least reference signature, or is able to transfer the data to be protected which are processed on the respective device to the safety module during the switching off of the processing devices.

Further, the invention proposes a method for securing data to be protected of a piece of equipment, the piece of equipment comprises:

a space;
at least one device for processing the data to be protected, the processing device being laid out in the space;
a safety module comprising at least one controller connected to at least one memory for sensitive data, the sensitive data giving access to the data to be protected, the safety module being at least partly laid out in the space; and at least one supervision sensor laid out in the space;

the method comprising the following steps
transmitting at least one signature through the sensor(s), to the safety module, the signature being based on a signal received by the respective sensor and giving information on the physical condition of the space;
comparing in the safety module at least one of the signatures and/or a value inferred from at least one of the signatures with at least one reference value and/or at least one reference signature;
limiting access to the data to be protected on the basis of the comparison of at least one of the signatures.

According to Advantages Features:
limiting access to the data to be protected comprises destruction of the sensitive data and/or non-broadcasting of the sensitive data outside the safety module;
the method further comprises the following step: transmitting at least one signal which at least partly crosses the space so as to be received by at least one of the sensors, the signature being inferred from this received signal; and/or
the safety module comprises at least one device for detecting an intrusion in order to detect an intrusion in the safety module, the method further comprising the following step: destroying or deleting the sensitive data in the memory when the intrusion detection device detects an intrusion in the safety module.

BRIEF DESCRIPTION OF THE DRAWINGS

Other features and advantages of the present invention will emerge from the description made below, with reference to the drawings which illustrate an exemplary embodiment without any limitation and wherein.

DETAILED DESCRIPTION OF CERTAIN EMBODIMENTS

Figure 1:
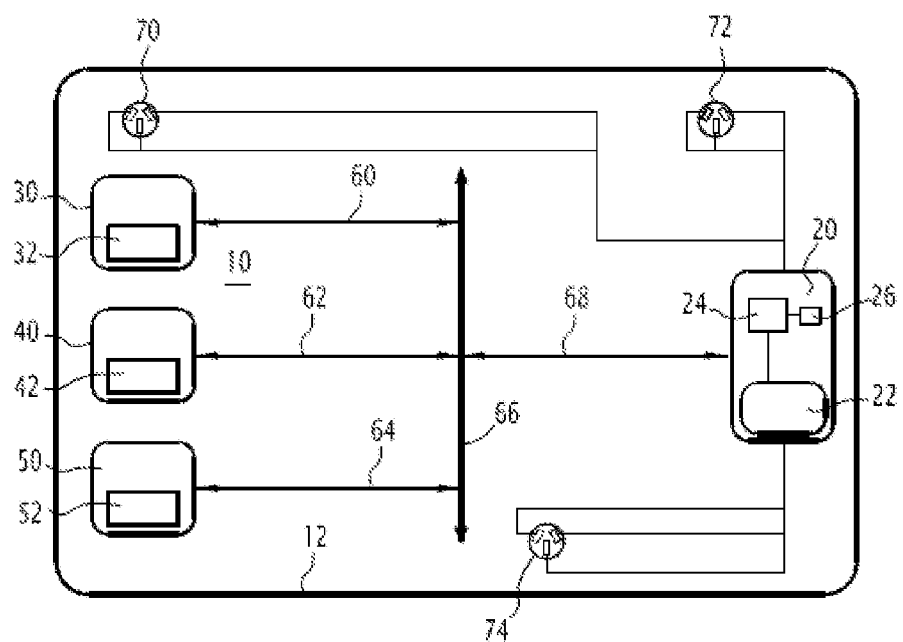
FIG. 1 is a schematic view of a system according to an embodiment of the invention.

FIG. 1 schematically shows an embodiment of a system according to the invention integrated into a piece of equipment. The system is designed for protecting the data processed by the piece of equipment. For example, the data to be protected are software packages and/or data which are processed by the software packages of the equipment.

The system comprises a space 10 to be monitored which is limited by an enclosure 12, for example a wall of a casing. The space 10 has a relatively large volume, for example of more than 1 liter. The space 10 is not limited to a parallelepiped. The enclosure 12 separates the inside of the space 10 from an outer non-secured volume.

The system comprises a safety module 20 which is laid out inside the space 10. The safety module has a limited volume, for example of less than 1 liter.

In the embodiment of FIG. 1, the safety module 20 interiorly has a memory 22 for storing sensitive data, a controller 24 and a device 26 for detecting an intrusion in the safety module which is always active, in particular even if the safety module 20 is no longer supplied with current.

In the embodiment of FIG. 1, the sensitive data are data processed by the piece of equipment. The device for detecting an intrusion 26 operates at least temporarily without an outer electric power supply by means of its own energy storage.

In an embodiment, the device for detecting an intrusion 26 is a safety cover which comprises a conductive meshing which completely surrounds the safety module 20. The device for detecting an intrusion 26 detects any intrusion attempt in the safety module 20, for example if someone tries to drill a hole in order to access the data to be protected. In this case, the intrusion detection device 26 measures a change in the electric resistance of the conductive meshing and destroys the sensitive data stored in the memory 22 in the case of detecting a change in the resistance. The sensitive data are deleted or destroyed by using the own energy of the safety module.

In another embodiment, the safety module 20 is integrated into an electronic component in which the intrusion detection device 26 also detects any access attempt or entrapment and destroys in the case of an access attempt the data to be protected stored in the component.

Several data processing cards 30, 40, 50 are laid out in the space 10 and each have processing means like a controller and memories 32, 42, 52 respectively. The data processing cards 30, 40, 50 process the data to be protected and form a processing device.

The data to be protected circulate inside the space 10 through communication connections 60, 62, 64, 66, 68, for example buses, for exchanging or transferring the data to be processed between the processing cards 30, 40, 50 or between the processing cards 30, 40, 50 and the safety module 20. The communication connections between the safety module 20 and the data processing devices 30, 40, 50 are laid out in the space 10. The processing cards 30, 40, 50 are able to receive the data to be protected from the safety module 20.

If the piece of equipment is switched off, the memories 32, 42, 52 forget or delete the data to be protected.

In another embodiment, the memories send, with the remaining energy, the data to be protected to the safety module 20 before deleting the data to be protected from their own memory.

One or several sensors 70, 72, 74 are laid out in the space 10 and connected to the safety module 20. The communication connections between the safety module 20 and the sensor(s) are laid out in the space 10.

The sensors are for example transmitters and/or receivers of ultrasonic waves, electromagnetic waves or any other type of wave for detecting a physical change or an intrusion into the space 10. They are positioned in locations and well selected in number in order to make the sought detection efficient.

For example, each sensor 70, 72, 74 is able to transmit a signal and detect a received signal. The signal to be transmitted is stored in the sensor 70, 72, 74 or is provided by the safety module 20. The received signal is for example a reflected signal from a signal transmitted by the same sensor or a signal transmitted by one of the other sensors. In another embodiment, the sensor(s) detect a received signal which is transmitted by a transmission device independent of the sensors.

In an embodiment, the sensors 70, 72, 74 measure during the detection of the received signal the propagation time, the phase, and/or the frequency of the received signal. With the received signal, its phase, its frequency, and/or its propagation time it is possible to create a signature of the signal by the sensors 70, 72, 74. For example, the signature is an image of the space 10 or a cypher calculated from an image of the space 10. The signature in another embodiment is the signal received per se, the propagation time, the phase, and/or the frequency of the received signal.

The signatures of the sensors 70, 72, 74 then give an imprint of the physical condition of the space 10.

If the space 10 is modified, for example because someone has placed a probe for recording the data passing through the communication connections 60, 62, 64, 66, the signature of the space 10 created by at least one of the sensors 70, 72, 74 changes. A change in the signature corresponds to a change in the physical condition of the space and therefore to an intrusion in the space 10.

The signature is sent by the sensors 70, 72, 74 to the safety module 20. Typically, the sensors 70, 72, 74 are set into place for having good coverage of the space 10. Further, the number of sensors is not limited to three and is adapted to the space 10 to be monitored and to the size and shape of the space. For example, in an embodiment, the system comprises at least one sensor.

The safety module 20 stores reference signatures of the sensors 70, 72, 74 in the memory 22 of the safety module. The reference signatures are representative of the equipment without any modification. The reference signatures stored in the memory 22 correspond to an imprint or a physical condition inside the piece of equipment without modification of the enclosure and without probes set into place. If this imprint of the space 10 varies or changes, the safety module 20 detects that an intrusion has occurred during the period when the system was switched off by comparison of the received imprints with the reference imprints stored upon switching on.

Figure 2:
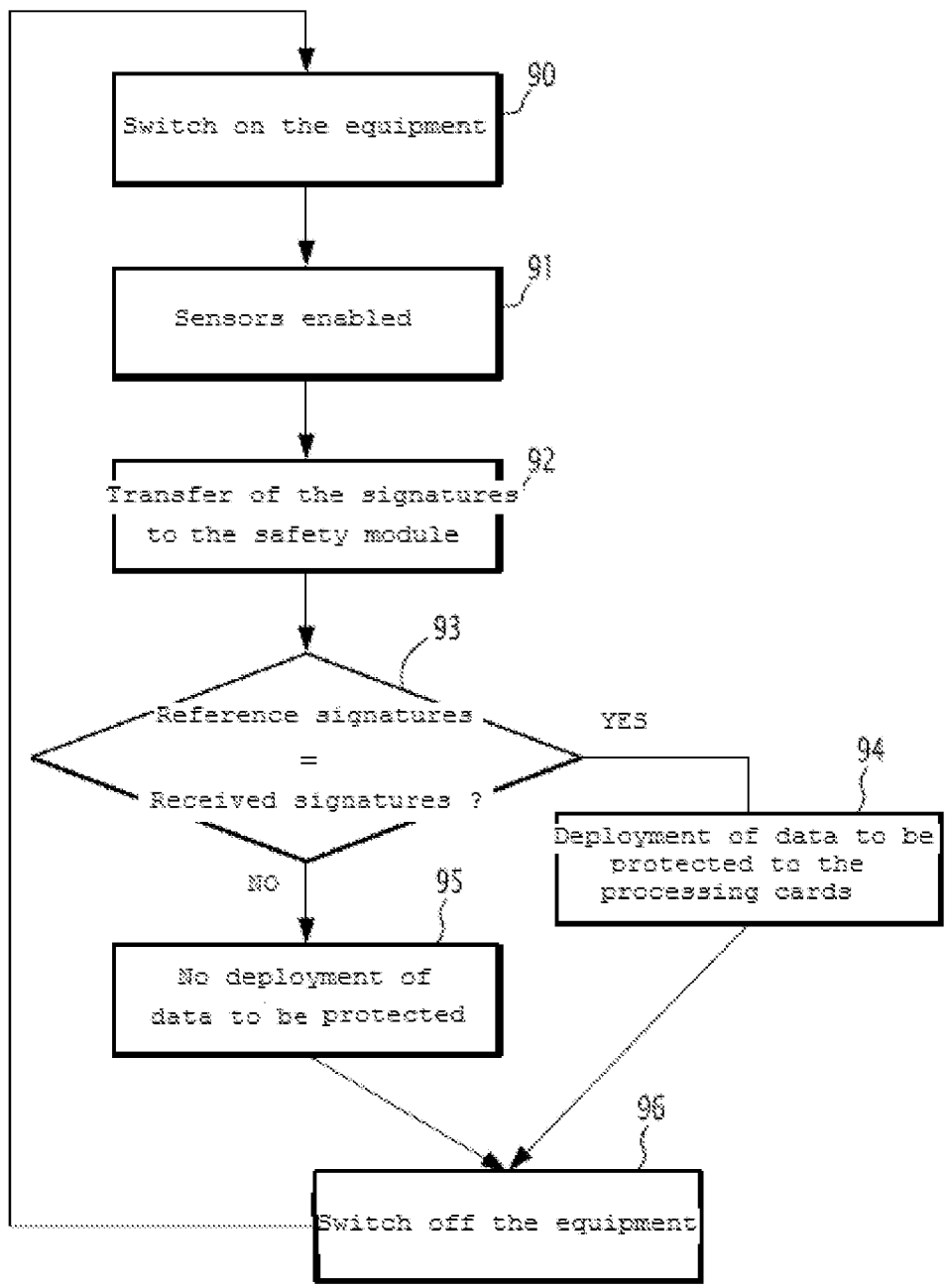
FIG. 2 is a flowchart of a method according to an embodiment of the invention.

In the following, a method according to an embodiment is explained by means of FIGS. 1 and 2.

During the setting into place of the equipment, the reference signatures are recorded and stored in the memory 22.

When the equipment is normally operating, i.e. when the equipment is switched on, the processing cards 30, 40, 50 processing the data to be protected, which are stored during this processing in the memories 32, 42, 52 are specific to the processing cards 30, 40, 50. During the whole power-on period, the different cards 30, 40, 50 in the space 10, and/or the safety module 20 exchange the state of their configuration and/or the data to be protected, which may change through the communication connections, 60, 62, 64, 66, 68.

When the system of FIG. 1 is switched off, all the data to be protected used in the processing cards 30, 40, 50 or in the respective memories 32, 42, 52 are deleted or forgotten. So, the only location where the data to be protected are still stored is the memory 22 of the safety module 20.

The space 10, except for the safety module 20 is not monitored if the equipment is switched off. Therefore, it is possible to attack the space 10, for example open or pierce the enclosure 12. The attacker has no access to the data to be protected, since they are no longer present on the processing cards 30, 40, 50 but only in the safety module 20.

If the attacker tries to retrieve the data to be protected from the safety module 20, the intrusion detection device 26 detects this intrusion and destroys the data to be protected stored in the memory 22. The attacker may however set into place entrapments or probes allowing, upon switching on the equipment, retrieval of the data to be protected which are normally transferred over the communication connection 60, 62, 64, 68 and/or modify the operation of the whole of the equipment. But such an entrapment will be detected by the system and method according to the invention as explained below.

When the piece of equipment is switched on and the safety module 20 starts in step 90, the safety module 20 establishes a connection with the sensors 70, 72, 74 installed in the space 10 and enables them (step 91). The sensors 70, 72, 74 transmit signals and receive a reflected signal as described above. Next, the respective signatures are transmitted to the safety module 20 (step 92). The safety module during step 93 compares the signatures with the reference signatures stored in its memory 22. If one of the signatures differs from the reference signatures, this means that the space 10 has been subject to physical modifications. In another embodiment, values inferred from the signatures, for example checksum, are compared with at least one reference value.

If the whole of the received signatures complies with the reference signatures or if the difference remains under a certain predetermined threshold, the safety module 20 broadcasts towards the different cards 30, 40, 50 in the space 10, the data to be protected required for their operation (step 94).

In the case when the comparison of the received signatures is different from the signatures stored in the memory 22, therefore the difference is above the predetermined threshold, the safety module 20 blocks the data to be protected in its memory 22 and no longer distributes them to the processing cards (step 95). Alternatively, the safety module 20 destroys or deletes the sensitive data in the memory 22 and does not transmit them. After this deletion or this destruction, the equipment can no longer operate, since the data to be protected required for the processing in the cards 30, 40, 50 are definitively lost.

In step 96, the equipment is switched off and the method again begins in step 90.

Figure 3:
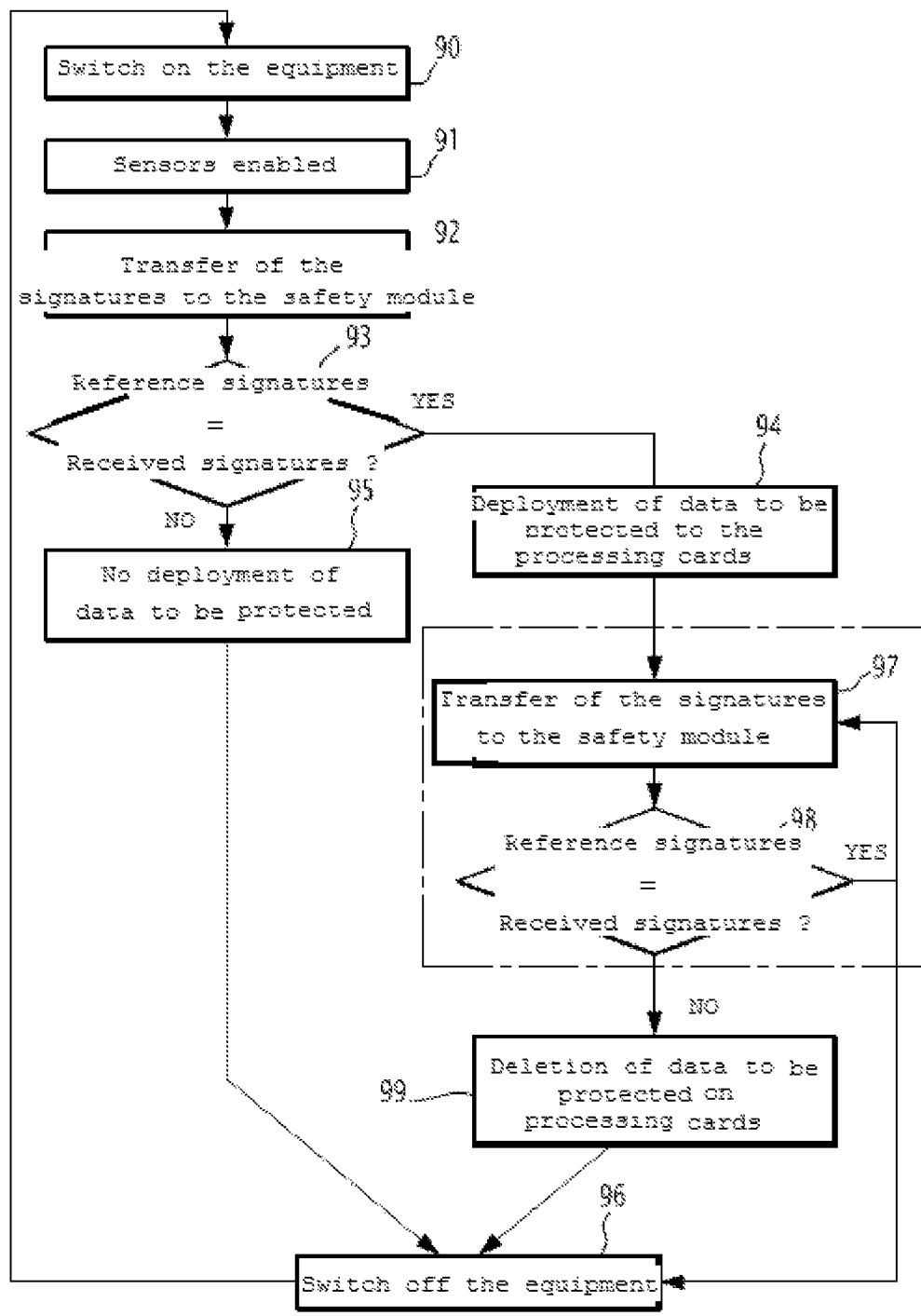
FIG. 3 is a flowchart of a method according to another embodiment of the invention.

In another embodiment, which is explained together with FIG. 3, during the normal operating phase with the steps 97 and 98 framed with the dotted line, the safety module 20 operates the sensors 70, 72, 74 in order to detect any intrusion attempt. The steps 90-96 are carried out like in the embodiment of FIG. 2. In the embodiment of FIG. 3, the steps 97 and 98 are regularly repeated during the normal operating phase, during which the cards 30, 40, 50 process the data to be protected.

During step 97, the safety module 20 receives the signatures from the sensors 70, 72, 74 which regularly transmit signals and receive a reflected signal as described above.

As described for step 93, during step 98, the safety module compares the signatures received with the reference signatures stored in its memory 22. If one of the signatures defers from the reference signatures, this means that the space 10 has been subject to physical modifications.

In the case of detection of intrusion into the space 10, the safety module 20 requests through a command during step 99 that the processing cards 30, 40, 50 should urgently erase all the data to be protected which they have. Upon receiving this command, the processing cards 30, 40, 50 carry out this deletion of the data to be protected.

In another alternative, the data to be protected either calculated or modified by the processing cards 30, 40, 50 are again transferred with the remaining energy and time to the safety module 20 before deletion and saved in the safety module 20 if an intrusion is detected during the normal operating phase. During step 99, the safety module 20 requests that the processing cards 30, 40, 50 should transmit to the safety module the data to be protected which they have calculated and to delete the data to be protected which they have. The data to be protected are in an embodiment, calculated from initial data provided by the safety module.

In another embodiment, the data to be protected calculated by the processing cards 30, 40, 50 are periodically sent to the safety module 20. The processing cards 30, 40, 50 delete the data to be protected upon receiving a request from the safety module 20 when the safety module has detected an intrusion by comparing the received signatures with the reference signatures stored in its memory 22, for example in step 99. In this embodiment, only the data to be protected calculated between the last transfer to the safety module and the command for deletion by the safety module are lost.

Figure 4:
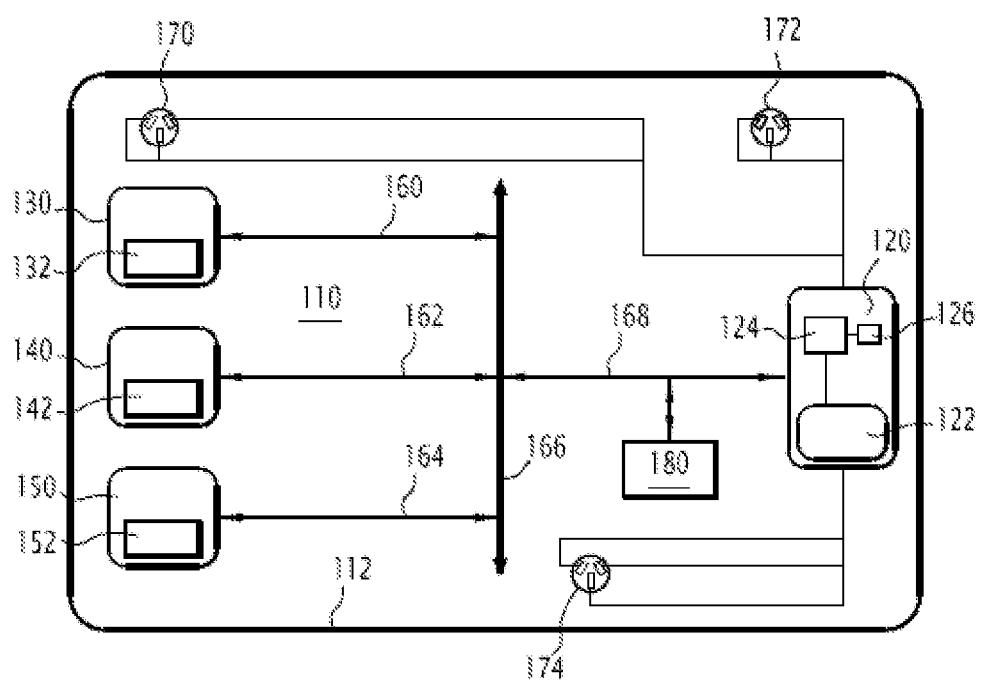
FIG. 4 is a schematic view of a system according to another embodiment of the invention.

FIG. 4 schematically illustrates an alternative of a system and a method according to the invention. The reference numbers are increased by 100 with respect to the embodiment illustrated in FIG. 1. The equipment is substantially identical with the equipment of FIG. 1, except for a memory 180 laid out in the space 110 on the outside of the safety module 120.

In the embodiment of FIG. 4, the sensitive data are different from the data to be protected. The data to be protected are stored in an encrypted form in the memory 180. A key for decrypting these data to be protected is stored in the memory 122 of the safety module 120. The key forms in this embodiment the sensitive data. Only the safety module 120 is capable of decrypting the data to be protected stored in the memory 180 and of retransmitting them to the cards 130, 140, 150 after decryption.

The method operates similarly to the method explained with reference to FIG. 2, except that in the case of FIG. 4, the key for decrypting the data to be protected forms the sensitive data. The decrypted data to be protected, used in the processing cards 130, 140, 150 or in the respective memories 132, 142, 152 are deleted or forgotten during the switching off of the equipment. If an intrusion is detected when the equipment is switched on, i.e. if the received signatures and the reference signatures are different, the safety module 120 deletes or destroys the key or does not use the key for decrypting the data to be protected. After deletion or destruction of the key, the equipment can no longer operate, since the data to be protected required for the processing in the cards 130, 140, 150 are inaccessible.

In an embodiment, like in the embodiment described together with FIG. 3, during the normal operating phase, the safety module 120 operates the sensors 170, 172, 174 in order to detect any intrusion attempt. In the case of detection of intrusion in the space 110, the safety module 120 requests during step 99 that the processing cards 130, 140, 150 should urgently delete all the data to be protected which they have.

In another alternative, the data to be protected, modified or calculated by the processing cards 130, 140, 150 are saved in an encrypted form in the memory 180 by the safety module if an intrusion is detected during the normal operating phase. For example, the processing cards 130, 140, 150 transfer the data to be protected on request from the safety module or regularly to the safety module 120 which encrypts them and stores them in the memory 180.

In an embodiment, the processing devices are integrated into the sensors or the sensors are integrated into the processing devices. For example, the data to be protected may be in this case, mathematical functions which are used for generating other data to be protected from the received signals.

The method and the device give the possibility of contemplating and protecting relatively large volumes. For example, the space has a volume of more than 2 liters, in particular more than 10 liters. Indeed, the sensors are only used when switched on, this allows application of different types of sensor technology either energy consuming or not and in a desired amount. This allows the use of much less expensive sensors as compared with a solution completely covering the space 10 with a conductive meshing. On the basis of a safety module, the invention gives the possibility of protecting any type of equipment without any volume constraint. Further, the invention has a great efficiency on large volumes, an adaptation to multiple equipment configurations and a limited cost if one already has a safety module.

What is claimed is:

1. A system for securing data to be protected of a piece of equipment comprising:
    a space;
    at least one processing device for processing the data to be protected, the processing device(s) being laid out in the space; and
    a safety module comprising at least one controller connected to at least one memory for sensitive data, the sensitive data giving access to the data to be protected, the safety module being at least partly laid out in the space,
    wherein at least one supervision sensor laid out in the space, said or each sensor being connected to the controller of the safety module for sending it a signature based on a signal received by the respective sensor, the signature giving a piece of information on the physical condition of the space, the controller being configured to limit access to the data to be protected, in case of a detection of intrusion in into the space on the basis of a comparison of the at least one signature and/or of a value inferred from the at least one signature with at least one reference value and/or at least one reference signature wherein the safety module comprises at least one device for detecting an intrusion in order to detect an intrusion in the safety module, the at least one device for detecting an intrusion being configured to cause destruction and/or deletion of the sensitive data stored in the memory during an intrusion in the safety module, wherein the space, except for the safety module, is not monitored if the equipment is switched off.

2. The system according to claim 1, wherein limitation of the access to the data to be protected comprises destruction of the sensitive data and/or non-broadcasting of the sensitive data outside the safety module.

3. The system according to claim 1, wherein at least one of the processing devices is laid out on the outside of the safety module.

4. The system according to claim 1, wherein the sensitive data comprise data to be protected or the sensitive data are a key for decrypting and/or encrypting data to be protected, which data to be protected are stored outside the safety module in an encrypted form.

5. The system according to claim 1, wherein each processing device is configured to delete the data to be protected which are processed on the respective device, in case of a detection of intrusion in into the space, on the basis of the comparison of the at least one signature and/or of a value inferred from the at least one signature with at least one reference value and/or at least one reference signature, or is configured to delete when the devices for processing the data to be protected which are processed on the respective device are switched off.

6. The system according to claim 1, wherein each processing device is configured to transfer the data to be protected which are processed on the respective device to the safety module, in case of a detection of intrusion in into the space, on the basis of the comparison of the at least one signature and/or of a value inferred from the at least one signature with at least one reference value and/or at least one reference signature or is configured to transfer the data to be protected which are processed on the respective device to the safety module when the processing devices are switched off.

7. A method for securing data to be protected of a piece of equipment, the piece of equipment comprises:
   a space;
   at least one device for processing of the data to be protected, the processing device being laid out in the space;
   a safety module comprising at least one controller connected to at least one memory for sensitive data, the sensitive data giving access to the data to be protected, the safety module being at least partly laid out in the space, wherein the safety module comprises at least one device for detecting an intrusion in order to detect an intrusion in the safety module; and
   at least one supervision sensor laid out in the space, wherein the space, except for the safety module, is not monitored if the equipment is switched off,
the method comprising the following steps:
   destroying or deleting the sensitive data in the memory when the intrusion detection device detects an intrusion in the safety module;
   transmitting at least one signature through the sensor(s) to the safety module, the signature being based on a signal received by the respective sensor and giving a piece of information on the physical condition of the space;
   comparing in the safety module the at least one signature and/or a value inferred from the at least one signature with at least one reference value and/or at least one reference signature; and
   limiting access to the data to be protected, in case of a detection of intrusion in into the space, based on the comparison of the at least one signature.

8. The method according to claim 7, wherein limiting access to the data to be protected comprises destruction of sensitive data and/or non-broadcasting of the sensitive data outside the safety module.

9. The method according to claim 7, further comprising:
   transmitting at least one signal which at least partly crosses the space so as to be received by at least one of the sensors, the signature being inferred from this received signal.

* * * * *